J. C. WELLS.
OPHTHALMIC MOUNTING.
APPLICATION FILED MAY 3, 1915.
1,225,689.
Patented May 8, 1917.
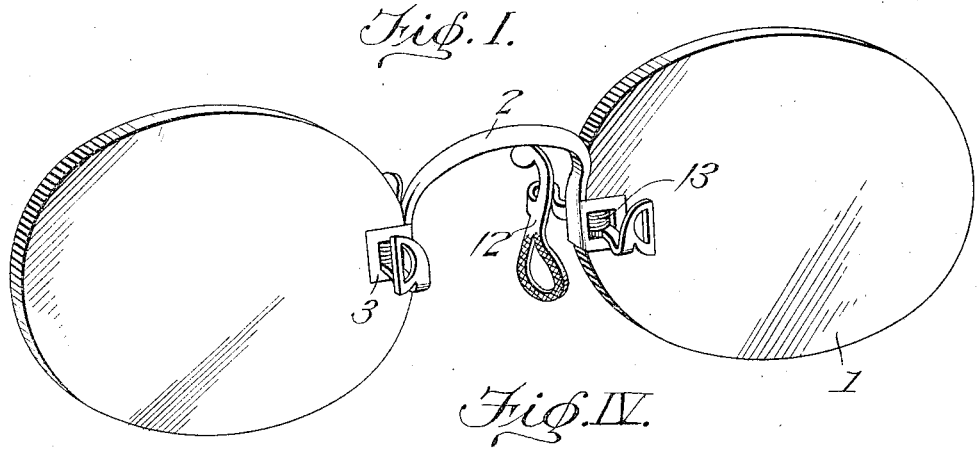
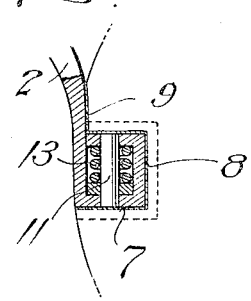
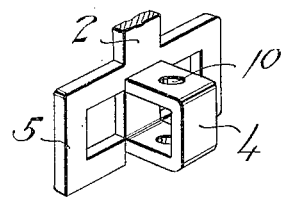
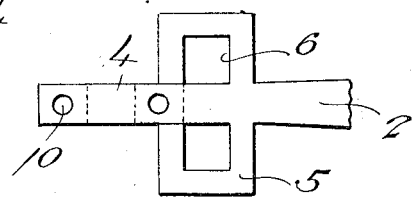
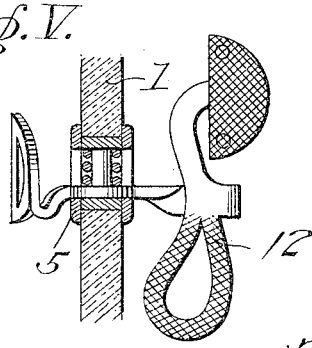
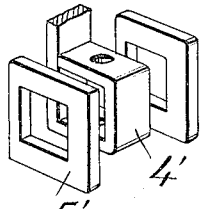
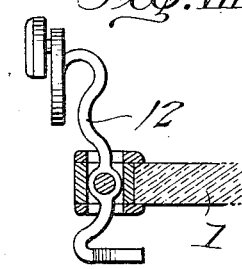
WITNESSES:
Joseph J Demers
Carroll Bailey
INVENTOR
Joel C. Wells,
BY
H. H. Styll & H. K. Parsons
ATTORNEYS

UNITED STATES PATENT OFFICE.

JOEL C. WELLS, OF SOUTHBRIDGE, MASSACHUSETTS.

OPHTHALMIC MOUNTING.

1,225,689.  Specification of Letters Patent.  Patented May 8, 1917.

Application filed May 3, 1915. Serial No. 25,498.

*To all whom it may concern:*

Be it known that I, JOEL C. WELLS, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to an improved clip connection between the lenses and a bridge of eyeglasses, whereby the following objects are accomplished.

The leading object of the invention is to provide a finger-piece mounting which will permit of the provision of an extremely narrow pupillary distance between the lenses and to provide such a mounting which will be neat and inconspicuous in appearance.

Another object is to provide a mounting which will permit the use of large lenses and which will instead of weakening the lenses at its point of attachment thereto, serve to strengthen the same.

Still another object is to so construct the mounting that loosening of any of the parts thereof when in applied position upon the lenses is positively prevented.

Still another object resides in the provision of a novel form of clip and so associating the same with the lenses as to obviate any annoyances to the wearer of the mounting by its interference in the field of vision.

With the foregoing and other objects in view the invention consists in the novel features of construction and arrangement of parts as will be hereinafter more fully described, illustrated in the accompanying drawings, and claimed.

In the drawings:

Figure I is a perspective view of a pair of eyeglasses showing the improved mounting applied thereto.

Fig. II is an enlarged detail longitudinal sectional view through one of the clips.

Fig. III is a plan view showing the formation of the blank from which the improved clips are formed.

Fig. IV is a detail perspective view of the blank showing the same in course of being formed into a clip.

Fig. V is a transverse sectional view through the clip illustrating a slightly modified form of structure.

Fig. VI is a view similar to Fig. IV of the structure illustrated in Fig. V.

Fig. VII is a horizontal sectional view showing one manner in which an extremely narrow clip may be used.

Fig. VIII is a longitudinal sectional view illustrating a further slightly modified form of clip.

Referring to the drawings wherein is illustrated the preferred embodiment of my invention, the numeral 1 designates the lenses which are connected by the bridge 2 through the medium of the clips 3. It will be understood that various methods of forming the clips may be resorted to, and in Figs. I to IV inclusive of the drawings I have illustrated one preferred construction thereof.

In the embodiment of the invention referred to and by particular reference to Figs. III and IV of the drawings it will be noted that the bridge 2 is provided with an extension 4 which is adapted to be bent upon the dotted lines illustrated in Fig. III to form a substantially rectangularly-shaped box-like structure, which is shown to advantage in Fig. II of the drawings. Laterally extending flange members 5 are formed on the side edges of the extension 4 at any suitable or preferred point, and are adapted to be bent to lie against the side edges of the said extension after the same has been bent to the position illustrated in Fig. IV of the drawings, it being understood that a soldered connection is provided between all of the engaging parts of the clip in order to provide a rigid structure.

It will be noted that an opening 6 is formed in each of the members 5 so as to provide a free passage through the clip when the said laterally extending members are bent into their final position, and it will also be noted that the walls of the extension are of greater width than the thickness of the extension 4 so as to project beyond the outer edges thereof and form a channel therebetween after they are bent to their final position.

The lenses to which this improved form of clip is adapted to be secured are provided with recesses or slotted portions 7 of a size and shape conforming to the size and shape of the box like portion of the clip and into which the clip is adapted to seat, and by reference to the drawings it will be seen that when the clip is mounted within the recess the projecting portions of the members 5 will extend over the faces of the lenses adjacent the recess in order to positively prevent any lateral movement of the clip within the said recess. After inserting the clip within the recess a cementitious material 8 is preferably applied between the walls of the clip and recess in order to secure the clip therein.

A second cut-out or recess portion 9 is formed in the edge of the lens adjacent the recess 7 to receive the portion of the bridge which extends from the clip so that the inner portion of the bridge will be disposed in alinement with the peripheral edge of the lens and whereby the symmetrical appearance of the lens is unimpaired, the cementitious material 8 preferably being positioned between the edge of the lens and the adjacent portion of the bridge in order to further increase the rigidity of the mounting.

From the construction described it will be readily seen that an extremely rigid connection is provided between the lenses and clip and that because of forming the clip as an integral part of the bridge and providing the recesses 9 whereby the inner face of the bridge will lie in a plane coincident with the plane of the edge of the lens an extremely narrow pupillary distance is provided between the lenses and that very large lenses may be accommodated by the mounting. It should also be apparent that by inserting the clip having the flanges thereon into the recess of the lens and cementing the same therein, the lens at its point of connection with the clip is considerably strengthened.

Apertures 10 are formed in the upper and lower portions of the clip and these apertures are adapted to receive the pivot 11, upon which is mounted the guard 12, the guard being of any desirable or preferred construction and being actuable through the medium of the spring 13.

By reference to Fig. II of the drawings it will be noted that the pivot 11 extends through the upper and lower walls of the clip and has the outer end thereof abutting against the adjacent wall of the recess of the lens so that accidental disengagement of the pin and parts carried thereby is positively prevented.

In Figs. V and VI of the drawings I have illustrated another form of my invention in which the side members 5' instead of being formed as an integral part of the bridge are formed of separate pieces and are adapted to be soldered or otherwise suitably secured to the edges of the box like portion 4' in order to provide a structure in other respects similar to the structure illustrated in Figs. I to IV inclusive of the drawings.

In Figs. I to VI inclusive of the drawings it will be noted that I have provided the clip as an integral part of the bridge 2 but I do not wish to be limited to this particular manner of forming the clip, since it will be obvious that the box like portion 4 or 4' may be formed of a separate strip of material and may have the ends of the bridge secured thereto in any suitable manner, as is clearly illustrated in Fig. VIII of the drawings.

I also wish to have it understood that instead of having both ends of the pivot 11 abutting the adjacent walls of the slot of the lens in order to retain the same within the clip, I may reduce and thread the lower end of the pivot as indicated at 14 in Fig. VIII of the drawing, for engagement in a threaded recess in either the upper or lower wall of the clip, this being an advantageous structure in that it facilitates assembling of the clips during their manufacture.

In Fig. VII of the drawings I have illustrated one manner in which a very narrow form of clip may be utilized. In this form of my invention I so turn the arm of the guard as to dispose the edges thereof in a horizontal position instead of in a vertical position as is illustrated in Figs. II and V of the drawings, and by so positioning the arm it should be readily seen that I reduce the space between the vertical walls of the clip to a minimum so that any interference of the clip with the vision of the wearer is obviated. In this form of my invention 1 also bend the actuating portion of the arm to a position so that the inner edge of the finger engaging portions thereof will lie in substantially the same plane as the inner edge of the extension 5, so that the said actuating portion will in no wise interfere with the vision.

From the foregoing it should be seen that a mounting has been provided which permits of an extremely narrow pupillary distance between the lenses, that the same is neat and inconspicuous in appearance, which permits of the use of large lenses, which strengthens instead of weakens the lenses, and which effectually secures the parts thereof against accidental disengagement from their operative position.

From the foregoing description taken in connection with the accompanying drawings it is thought that the advantages of the improved clip should be readily apparent, and while I have herein shown and described certain embodiments of my invention I do not wish to be limited thereto except to such limitations as the claims may import.

I claim:

1. An eyeglass mounting comprising in combination with a lens having a recess formed therein, a bridge having a portion thereof disposed within the recess with the terminus of its inner face flush with the edge of the lens, whereby the inner face of said portion of the bridge forms a continuation of the curve of the edge of the lens.

2. In a mounting of the character described, the combination with a lens having a recess formed therein, of a clip disposed within said recess, said lens having a second recess formed adjacent said first recess, and a bridge having a portion thereof secured within said second recess.

3. In an ophthalmic mounting, the combination with a lens having recesses formed therein, of a bridge having the end thereof shaped to be received within one of said recesses, the other recess being adapted to receive a portion of the bridge whereby the symmetrical curvature of the edge of the lens is unimpaired, and an adhesive material for securing the bridge and clip within the recess.

4. A bridge for an ophthalmic mounting, comprising a central arched portion bearing a lens attaching member on each end thereof, said members each comprising a box having a central opening surrounded on three sides by walls each comprising a cross web connection and upstanding lateral flanges substantially normal to the web, the fourth wall of the box being formed by the bridge proper, substantially as described.

5. The combination with a lens having a larger aperture formed therein, of a mounting for the lens comprising an arch member bearing a box at its terminus, said box fitting within the aperture of the lens to bring the inner face of the arch flush with the edge of the lens, whereby the edge of the lens will contact with the nose when the mounting is in position on the face, the said box being centrally apertured and having a continuous web fitting the entire face or wall inclosing the aperture in the lens, and being further provided with front and rear side flanges overlying the web and the edges of the slot in the lens, and a cementitious medium uniting both the web and the side flanges with the inclosed portion of the lens, substantially as illustrated.

6. The combination with a lens having a socket formed at one edge thereof, of a mounting comprising a U-shaped member interiorly fitting the socket, lateral flanges secured to the sides of the U member and engaging the faces of the lens around the socket, and a bridging member secured to said parts and connecting the legs of the U to brace them against the walls of the socket in the lens.

In testimony whereof I affix my signature in presence of two witnesses.

JOEL C. WELLS.

Witnesses:
CARROLL BAILEY,
JOSEPH J. DEMERS.

Copies of this patent may be obtained for five cents each, by addressing the "Commissioner of Patents, Washington, D. C."